US012302346B2

(12) United States Patent
Khoshnevisan et al.

(10) Patent No.: US 12,302,346 B2
(45) Date of Patent: May 13, 2025

(54) DOWNLINK FEEDBACK INFORMATION WITH PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/813,507

(22) Filed: Jul. 19, 2022

(65) Prior Publication Data

US 2023/0114685 A1    Apr. 13, 2023

Related U.S. Application Data

(60) Provisional application No. 63/262,486, filed on Oct. 13, 2021.

(51) Int. Cl.
*H04W 72/23* (2023.01)
*H04L 1/1812* (2023.01)

(52) U.S. Cl.
CPC .......... *H04W 72/23* (2023.01); *H04L 1/1812* (2013.01)

(58) Field of Classification Search
CPC ....... H04L 1/08; H04L 1/1671; H04L 1/1812; H04L 1/1816; H04L 1/1822; H04L 1/189; H04L 1/1896; H04L 5/0053; H04L 5/0055; H04W 72/23; H04W 72/232
See application file for complete search history.

(56) References Cited

U.S. PATENT DOCUMENTS

| | | |
|---|---|---|
| 2020/0313807 A1 | 10/2020 | Salem |
| 2021/0050947 A1* | 2/2021 | Tsai ...................... H04W 72/23 |
| 2021/0105812 A1 | 4/2021 | Rastegardoost et al. |
| 2022/0303100 A1* | 9/2022 | Yang ..................... H04L 1/1861 |
| 2024/0195577 A1* | 6/2024 | Matsumura ........... H04L 5/0094 |

FOREIGN PATENT DOCUMENTS

WO    2020067815 A1    4/2020

OTHER PUBLICATIONS

International Search Report and Written Opinion—PCT/US2022/075733—ISA/EPO—Dec. 19, 2022.

* cited by examiner

*Primary Examiner* — Thomas R Cairns
(74) *Attorney, Agent, or Firm* — Harrity & Harrity, LLP

(57) ABSTRACT

Various aspects of the present disclosure generally relate to wireless communication. In some aspects, a mobile station may receive a set of physical downlink control channel (PDCCH) candidates, wherein the set of PDCCH candidates are linked for PDCCH repetition. The mobile station may detect downlink control information (DCI) carrying downlink feedback information (DFI) in one or more PDCCH candidates. The mobile station may identify a PDCCH candidate as a reference PDCCH candidate based at least in part on the PDCCH candidate satisfying one or more criteria. The mobile station may determine whether the DFI is valid for a physical uplink shared channel (PUSCH) transmission based at least in part on whether a last symbol of the PUSCH transmission is at least a particular quantity of symbols prior to a first symbol of the reference PDCCH candidate. Numerous other aspects are described.

30 Claims, 13 Drawing Sheets

DOWNLINK FEEDBACK INFORMATION WITH PHYSICAL DOWNLINK CONTROL CHANNEL REPETITION

CROSS-REFERENCE TO RELATED APPLICATION

This patent application claims priority to U.S. Provisional Patent Application No. 63/262,486, filed on Oct. 13, 2021, titled "DOWNLINK FEEDBACK INFORMATION WITH PHYSICAL DOWNLINK CONTROL CHANNEL REPETITION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for downlink feedback information (DFI) with physical downlink control channel (PDCCH) repetition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a mobile station for wireless communication. The mobile station may include a memory and one or more processors coupled to the memory. The one or more processors may be configured to receive a set of physical downlink control channel (PDCCH) candidates, wherein the set of PDCCH candidates are linked for PDCCH repetition. The one or more processors may be configured to detect downlink control information (DCI) carrying downlink feedback information (DFI) in one or more PDCCH candidates of the set of PDCCH candidates. The one or more processors may be configured to identify a PDCCH candidate, of the set of PDCCH candidates, as a reference PDCCH candidate based at least in part on the PDCCH candidate satisfying one or more criteria. The one or more processors may be configured to determine whether feedback information for a transport block of a corresponding hybrid automatic repeat request (HARD) process number in the DFI is valid for a physical uplink shared channel (PUSCH) transmission based at least in part on whether a last symbol of the PUSCH transmission is at least a particular quantity of symbols prior to a first symbol of the reference PDCCH candidate.

Some aspects described herein relate to a method of wireless communication performed by a mobile station. The method may include receiving, by the mobile station, a set of PDCCH candidates, wherein the set of PDCCH candidates are linked for PDCCH repetition. The method may include detecting, by the mobile station, DCI carrying DFI in one or more PDCCH candidates of the set of PDCCH candidates. The method may include identifying, by the mobile station, a PDCCH candidate, of the set of PDCCH candidates, as a reference PDCCH candidate based at least in part on the PDCCH candidate satisfying one or more criteria. The method may include determining, by the mobile station, whether feedback information for a transport block of a corresponding HARQ process number in the DFI is valid for a PUSCH transmission based at least in part on whether a last symbol of the PUSCH transmission is at least a particular quantity of symbols prior to a first symbol of the reference PDCCH candidate.

Some aspects described herein relate to a non-transitory computer-readable medium that stores a set of instructions for wireless communication by a mobile station. The set of instructions, when executed by one or more processors of the mobile station, may cause the mobile station to receive a set of PDCCH candidates, wherein the set of PDCCH candidates are linked for PDCCH repetition. The set of instructions, when executed by one or more processors of the mobile station, may cause the mobile station to detect DCI carrying DFI in one or more PDCCH candidates of the set of PDCCH candidates. The set of instructions, when executed by one or more processors of the mobile station, may cause the mobile station to identify a PDCCH candidate, of the set of PDCCH candidates, as a reference PDCCH candidate based at least in part on the PDCCH candidate satisfying one or more criteria. The set of instructions, when executed by one or more processors of the mobile station, may cause the mobile station to determine whether feedback information for a transport block of a corresponding HARQ process number in the DFI is valid for a PUSCH transmission based at least in part on whether a last symbol of the PUSCH transmission is at least a particular quantity of symbols prior to a first symbol of the reference PDCCH candidate.

Some aspects described herein relate to an apparatus for wireless communication. The apparatus may include means for receiving a set of PDCCH candidates, wherein the set of PDCCH candidates are linked for PDCCH repetition. The apparatus may include means for detecting DCI carrying DFI in one or more PDCCH candidates of the set of PDCCH candidates. The apparatus may include means for identifying a PDCCH candidate, of the set of PDCCH candidates, as a reference PDCCH candidate based at least in part on the PDCCH candidate satisfying one or more criteria. The apparatus may include means for determining whether feedback information for a transport block of a corresponding HARQ process number in the DFI is valid for a PUSCH transmission based at least in part on whether a last symbol of the PUSCH transmission is at least a particular quantity of symbols prior to a first symbol of the reference PDCCH candidate.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
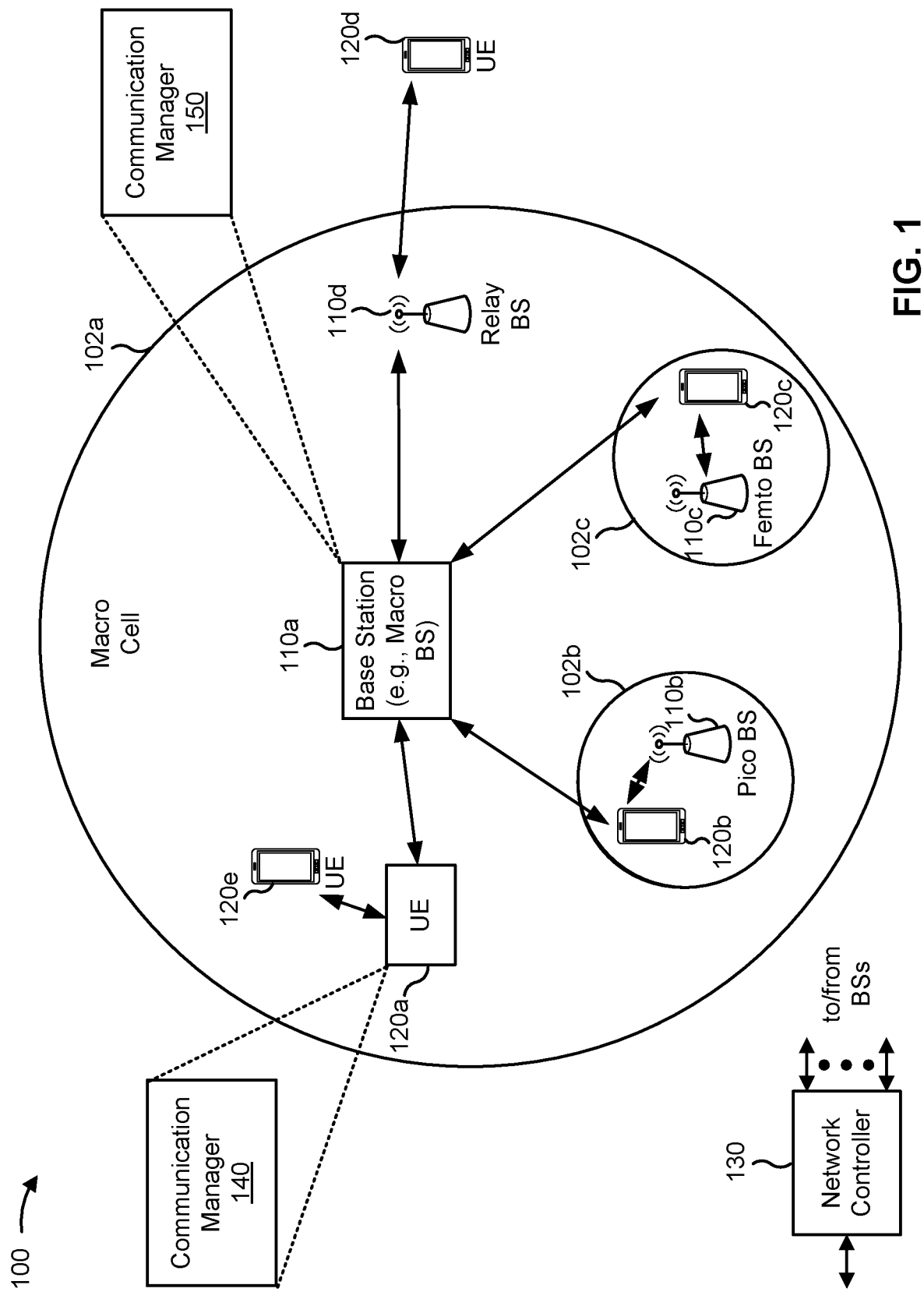
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform one or more operations associated with downlink feedback information (DFI) with physical downlink control channel (PDCCH) repetition. Additionally, or alternatively, the communication manager 140 may perform one or more other operations described herein.

As indicated above, FIG. 1 is provided as an example. Other examples may differ from what is described with regard to FIG. 1.

Figure 2:
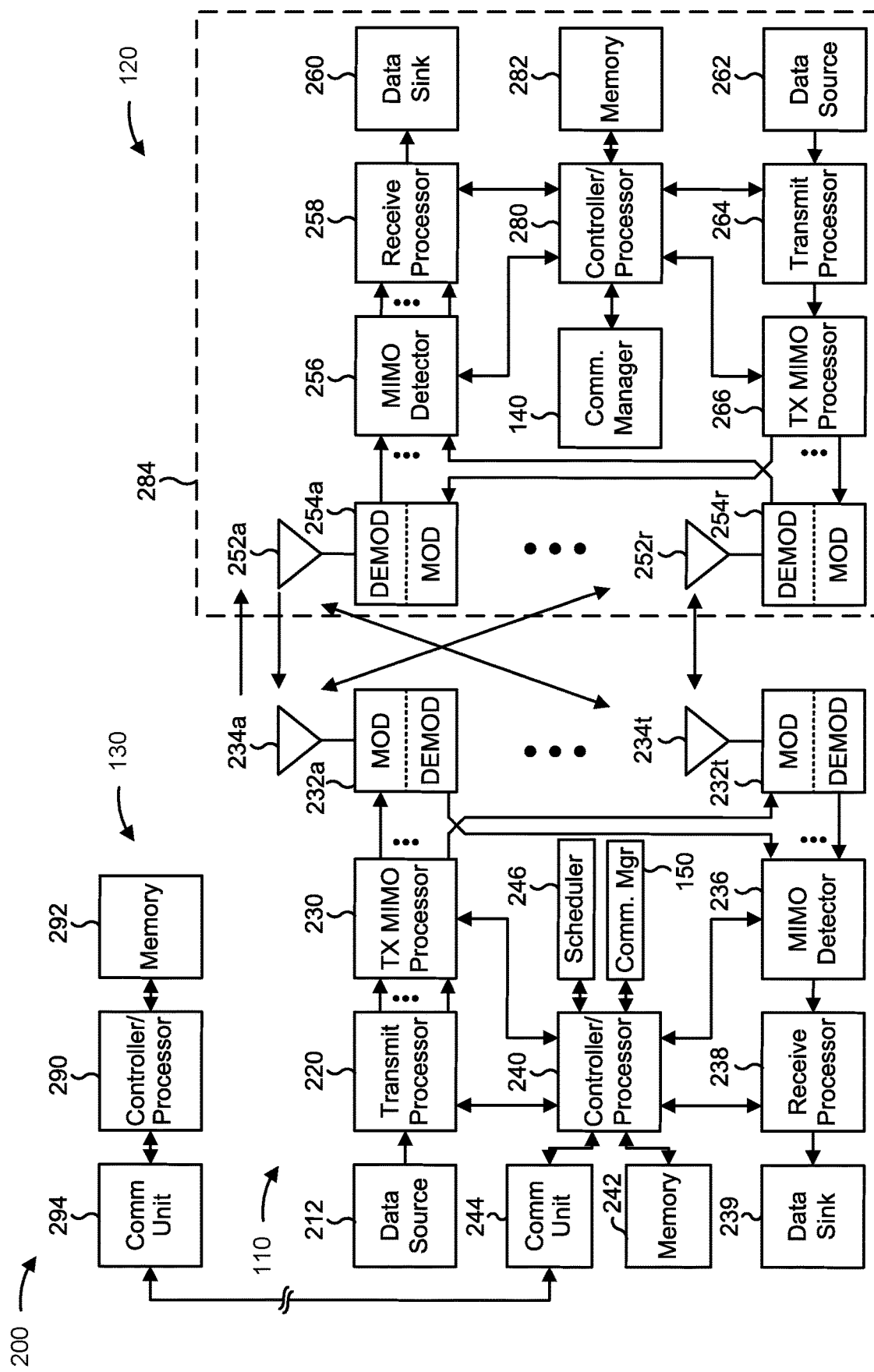
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4A-4D, 5, and 6).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4A-4D, 5, and 6).

The controller/processor 240 of the base station 110, the controller/processor 280 of the UE 120, and/or any other component(s) of FIG. 2 may perform one or more techniques associated with DFI with PDCCH repetition, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, and/or other processes as described herein. In some examples, executing instructions may include running the instructions, converting the instructions, compiling the instructions, and/or interpreting the instructions, among other examples.

In some aspects, a mobile station (e.g., UE 120) includes means for receiving, by the mobile station, a set of PDCCH candidates, wherein the set of PDCCH candidates are linked for PDCCH repetition; means for detecting, by the mobile station, downlink control information (DCI) carrying downlink feedback information (DFI) in one or more PDCCH candidates of the set of PDCCH candidates; means for identifying, by the mobile station, a PDCCH candidate, of the set of PDCCH candidates, as a reference PDCCH candidate based at least in part on the PDCCH candidate satisfying one or more criteria; and/or means for determining, by the mobile station, whether feedback information for a transport block of a corresponding HARQ process number in the DFI is valid for a physical uplink shared channel (PUSCH) transmission based at least in part on whether a last symbol of the PUSCH transmission is at least a quantity of symbols prior to a first symbol of the reference PDCCH candidate. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3E are diagrams illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of transmission time intervals (TTIs) may be used, other than subframes and/or slots. A slot 310 may include multiple symbols 315, such as 7 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the base station for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335, within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

In some cases, a UE may receive DCI via a PDCCH candidate. In some cases, the DCI may include DFI indicating feedback information associated with one or more previous PUSCH transmissions. For example, the DCI may comprise a particular format (e.g., DCI format 0_1) with a cyclic redundancy check (CRC) scrambled by a configured scheduling radio network temporary identifier (CS-RNTI). The DCI may include a DFI flag field. The UE may determine that the DCI includes DFI when the DFI flag field is set to a first value (e.g., 1) and may determine that the DCI does not include DFI when the DFI flag field is set to a second value (e.g., 0). The DFI included in the DCI when the DFI flag field is set to the first value may comprise a bitmap of 16 bits indicating feedback information (e.g., hybrid automatic repeat request (HARM) feedback information) for each identifier (e.g., for each HARQ identifier) of the previous PUSCH transmissions. In some cases, the UE may determine the validity of the DFI for each PUSCH transmission based at least in part on when the PUSCH transmission is received (e.g., by a base station 110 transmitting the DCI to the UE) with respect to a first symbol of the DCI that includes the DFI.

Figure 3A:
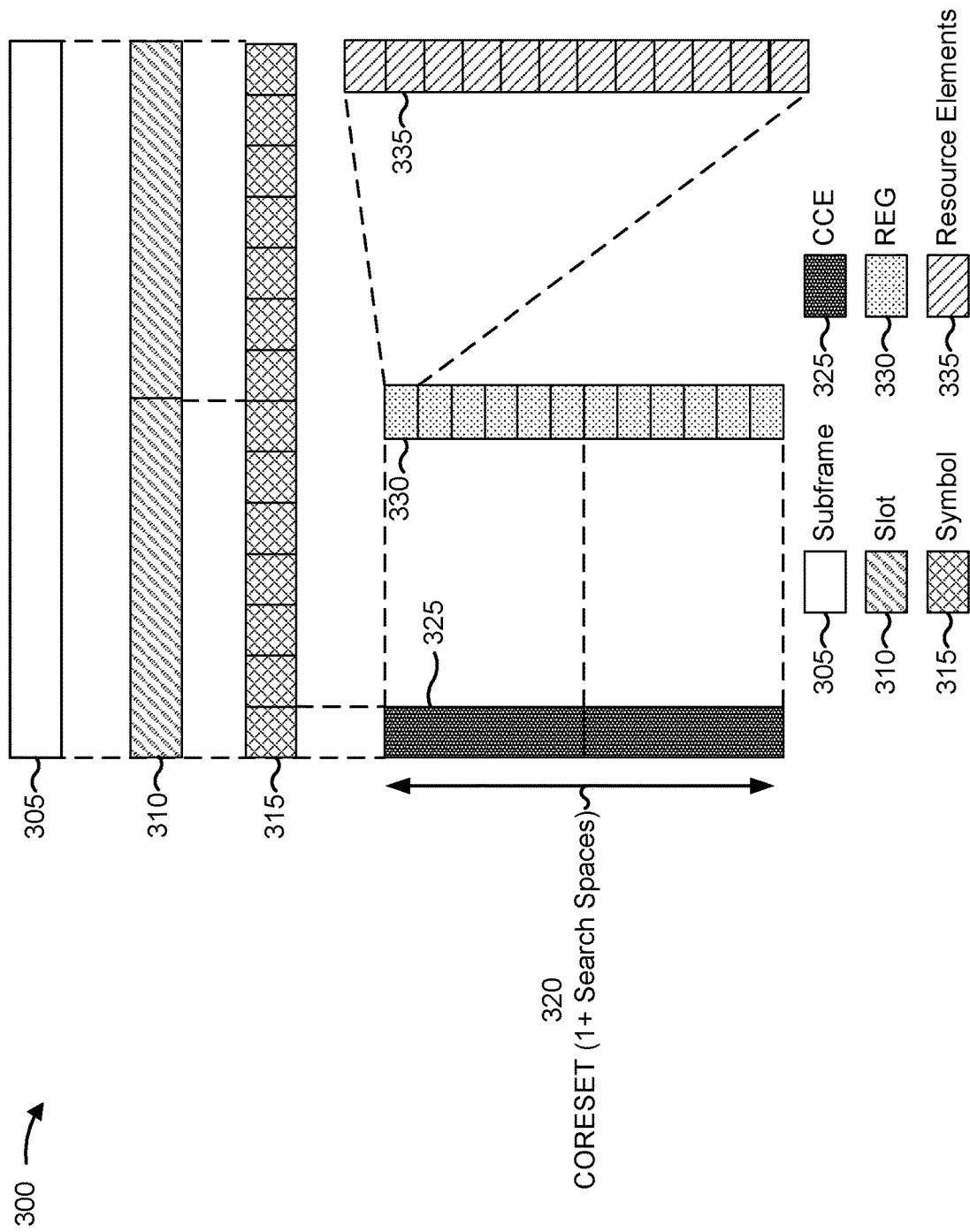
FIGS. 3A-3E are diagrams illustrating an example resource structure for wireless communication, in accordance with the present disclosure.
Figure 3B:
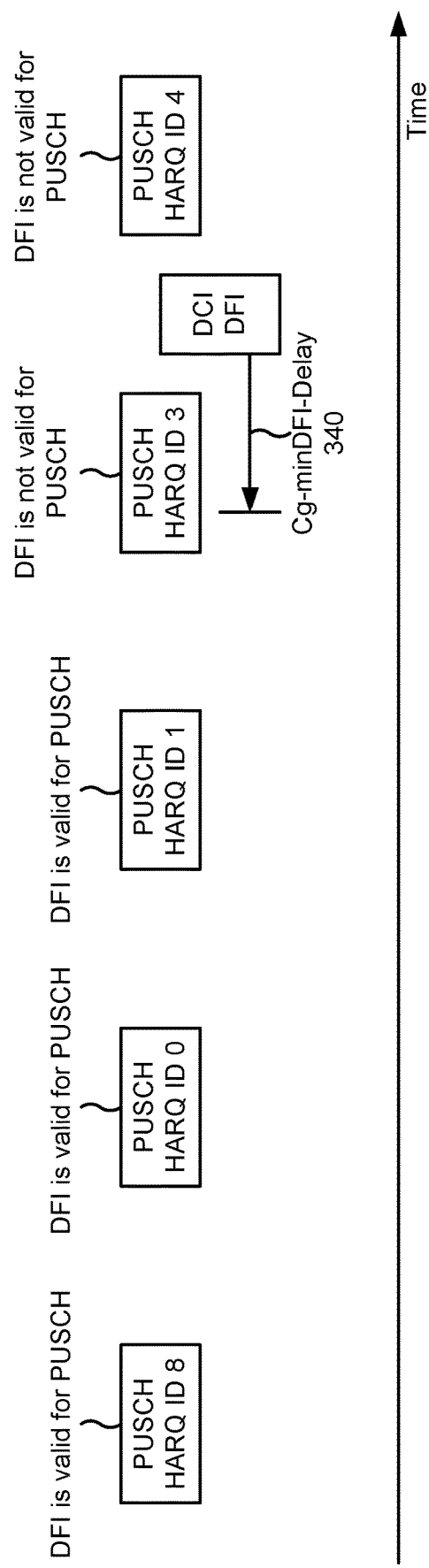

In some cases, the PUSCH transmissions may be transmitted without repetition. The PUSCH transmissions may be associated with a semi-static configuration (e.g., configured by a configured grant) or may be dynamically scheduled. The UE may determine that the DFI is valid for each PUSCH transmission having a last symbol that is transmitted at least a particular quantity of symbols prior to a first symbol of the DCI being received by the UE. In some cases, the particular quantity of symbols may be configured by the network (e.g., the base station 110 transmitting the DCI to the UE). For example, as shown in FIG. 3B, the particular quantity of symbols may correspond to a configured grant minimum DFI delay (cg-minDFI-Delay) parameter 340.

The UE may determine that the DFI is not valid for the PUSCH transmissions associated with the HARQ identifiers 3 and 4 based at least in part on the last symbol of the PUSCH transmissions not being transmitted at least the quantity of symbols indicated by the cg-minDFI-Delay parameter 340 prior to the first symbol of the DCI that includes the DFI being received by the UE. The UE may determine that the DFI is valid for the PUSCH transmissions associated with the HARQ identifiers 0, 1, and 8 based at least in part on the last symbol of each of the PUSCH transmissions being transmitted at least the quantity of symbols indicated by the cg-minDFI-Delay parameter 340 prior to the first symbol of the DCI that includes the DFI being received by the UE.

Figure 3C:
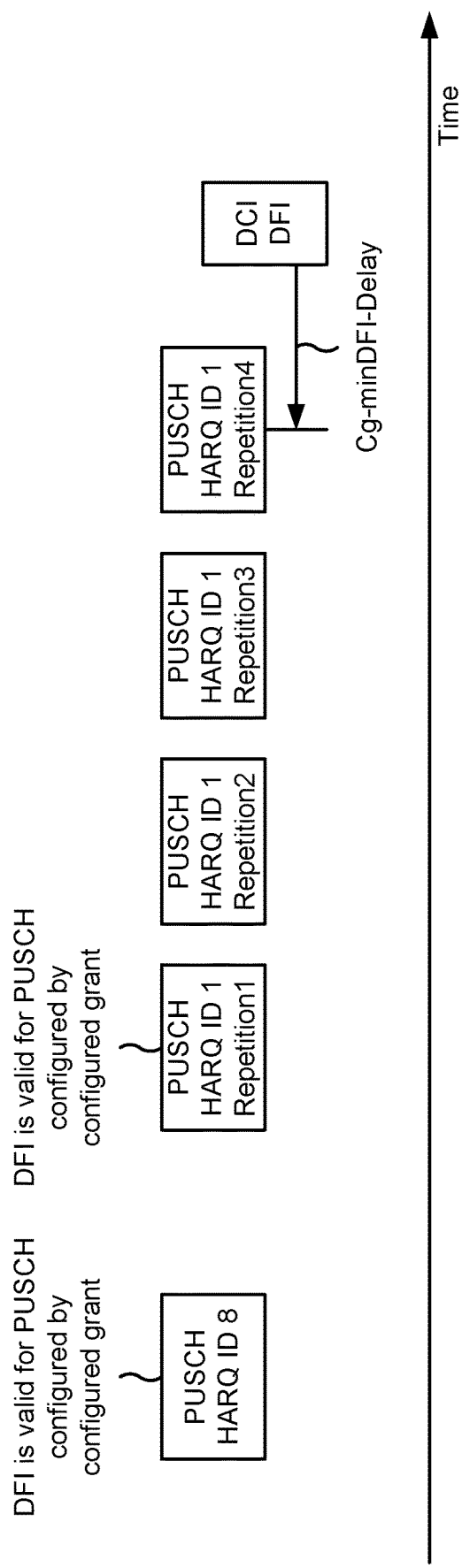

In some cases, as shown in FIG. 3C, a PUSCH transmission (e.g., the PUSCH transmission associated with HARQ identifier 1, as shown) may be configured by a configured grant and may be transmitted with repetitions. In these cases, the UE may determine that the DFI is valid for the PUSCH transmission when a last symbol of any repetition of the PUSCH transmission is transmitted at least the particular quantity of symbols prior to the first symbol of the DCI carrying the DFI being received by the UE.

Figure 3D:
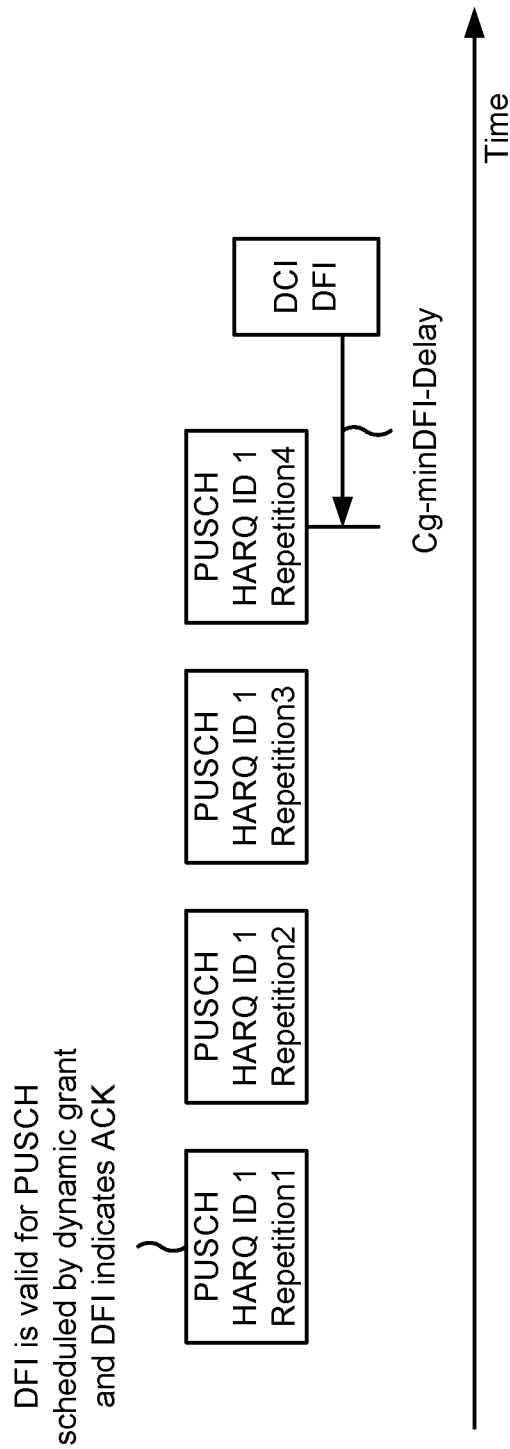

In some cases, as shown in FIG. 3D, a PUSCH transmission (e.g., the PUSCH transmission associated with HARQ identifier 1, as shown) may be scheduled by a dynamic grant and may be transmitted with repetitions. In these cases, the UE may determine that the DFI is valid for the PUSCH transmission when the DFI indicates an acknowledgement (ACK) associated with the PUSCH transmission and a last symbol of a first repetition of the PUSCH transmission is transmitted at least the particular quantity of symbols prior to the first symbol of the DCI carrying the DFI being received by the UE.

Figure 3E:
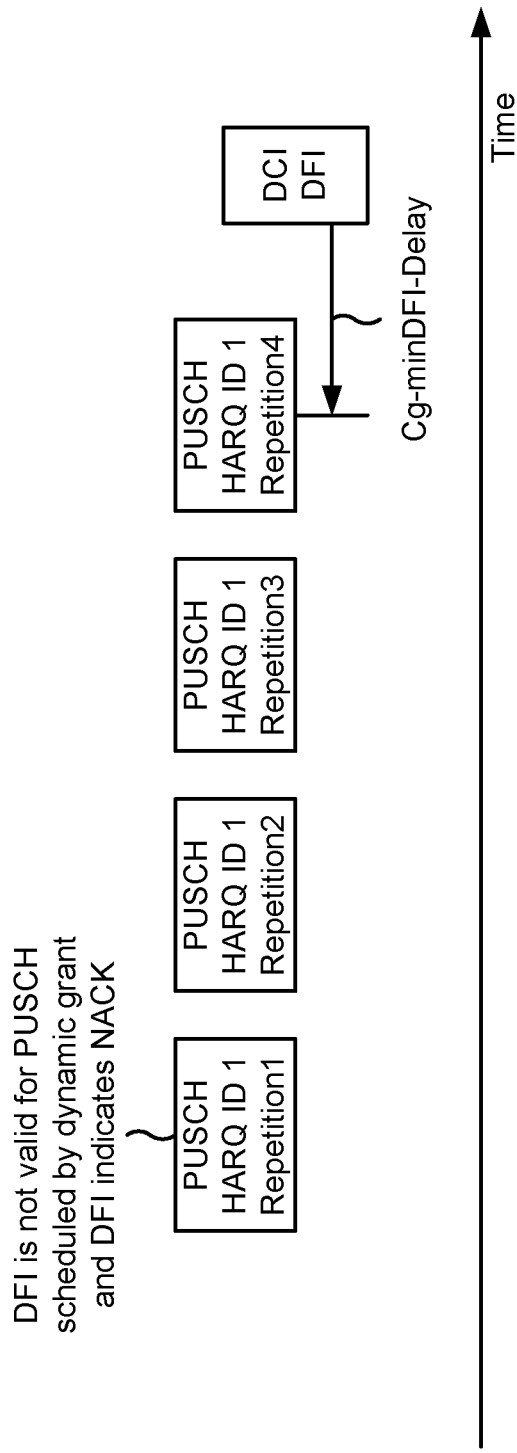

In some cases, the DFI may indicate a negative acknowledgement (NACK) associated with the PUSCH transmission. In these cases, the UE may determine that the DFI is valid for the PUSCH transmission when a last symbol of a last repetition of the PUSCH transmission is transmitted at least the particular quantity of symbols prior to the first symbol of the DCI carrying the DFI being received by the UE. As shown in FIG. 3E, the UE may determine that the DFI is not valid for the PUSCH transmission associated with the HARQ identifier (ID) 1 based at least in part on a last symbol of the last repetition of the PUSCH transmission (e.g., repetition 4, as shown) not being as least the particular quantity of symbols prior to the first symbol of the DCI carrying the DFI being received by the UE.

In some cases, each PDCCH candidate may be configured with repetition. For example, two SS sets may be linked by RRC configurations. The PDCCH candidates of the two linked SS sets may be one-to-one mapped (e.g., a first PDCCH candidate of a first SS set may be mapped to a first PDCCH candidate of a second SS set). The two PDCCH candidates that are mapped together may have the same aggregation level and may carry the same DCI payload.

The UE may receive the two PDCCH candidates and may decode the DCI in the first PDCCH candidate received by the UE or the second PDCCH candidate received by the UE, or may perform soft combining to decode the DCI. Thus, the UE may decode the DCI included in the first PDCCH candidate received by the UE, the DCI included in the second PDCCH candidate received by the UE, or both the DCI included in the first PDCCH candidate received by the UE and the DCI included in the second PDCCH candidate received by the UE.

In some cases, the DCI may include DFI indicating feedback information associated with one or more previous PUSCH transmissions. For example, the DCI may comprise a particular format (e.g., DCI format 0_1) with a CRC scrambled by a CS-RNTI. The DCI may include a DFI flag field set to a first value (e.g., 1) indicating that the DCI includes DFI associated with previous PUSCH transmissions. The UE may determine whether the DFI is valid for a PUSCH transmission in a manner similar to that described above. However, because the UE may decode the DCI included in the first PDCCH candidate, the second PDCCH candidate, or both the first PDCCH candidate and the second PDCCH candidate, the first symbol of the DCI carrying the DFI may vary based at least in part on the DCI decoded by the UE. Thus, the UE may determine different results with respect to whether the DFI is valid for a PUSCH transmission based at least in part on the DCI decoded by the UE.

Some techniques and apparatuses described herein enable a UE to identify a reference to be used to determine whether DFI is valid for a PUSCH transmission when the UE receives linked PDCCH candidates. In some aspects, the UE may determine the reference as corresponding to DCI received via a PDCCH candidate that satisfies one or more criteria. By utilizing the reference to determine whether the DFI included in the DCI is valid for the PUSCH transmission, the UE may prevent differing results from being determined based at least in part on the DCI decoded by the UE.

As indicated above, FIGS. 3A-3E are provided as an example. Other examples may differ from what is described with respect to FIGS. 3A-3E.

Figure 4A:
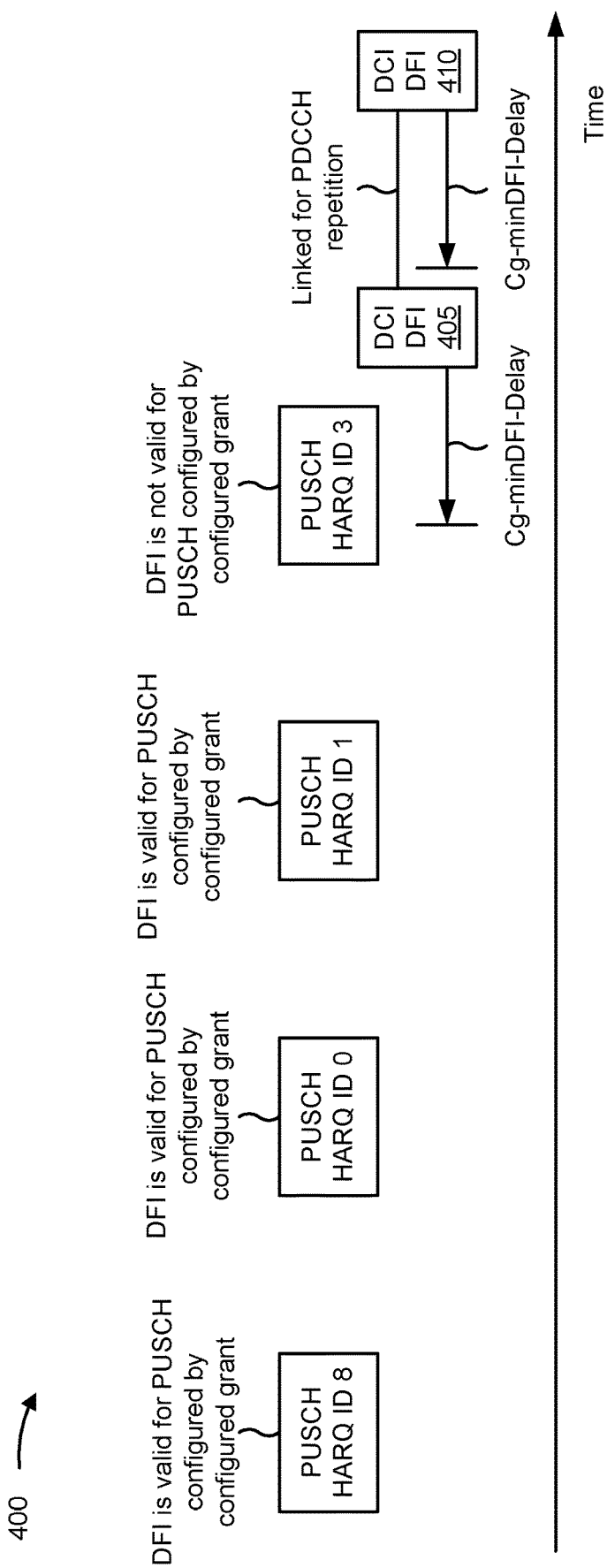
FIGS. 4A-4D are diagrams illustrating examples associated with downlink feedback information (DFI) with physical downlink control channel (PDCCH) repetition, in accordance with the present disclosure.

FIGS. 4A-4D are diagrams illustrating examples 400, 415, 430, 445 associated with DFI with PDCCH repetition, in accordance with the present disclosure. As shown in FIG. 4A, in some aspects, a UE (e.g., a UE 120) may receive a set of PDCCH candidates (e.g., PDCCH candidate 405 and PDCCH candidate 410, as shown). The PDCCH candidates may be linked for PDCCH repetition, as described elsewhere herein.

In some aspects, the UE may detect DCI carrying DFI in one or more of the PDCCH candidates 405, 410. In some aspects, the UE may decode the PDCCH candidate 405 and may detect that the DCI includes DFI. In some aspects, the UE may decode the PDCCH candidate 410 and may detect that the DCI includes the DFI. In some aspects, the UE may perform soft combining to decode the PDCCH candidate 405 and the PDCCH candidate 410 and may detect that the DCI includes the DFI based at least in part on performing the soft combining to decode the PDCCH candidate 405 and the PDCCH candidate 410.

In some aspects, the UE may detect that the DCI carries the DFI based at least in part on the DCI comprising a particular format (e.g., DCI format 0_1) with a CRC scrambled by a CS-RNTI and including a DFI flag field set to a particular value (e.g., 1). The DFI may comprise a bitmap of 16 bits indicating feedback information (e.g., HARQ feedback information) for each identifier (e.g., for each HARQ identifier) of the previous PUSCH transmissions.

In some aspects, the UE may determine one or more reference criteria for determining a reference to be utilized to determine a validity of the DFI for each PUSCH transmission. In some aspects, the one or more reference criteria may indicate that the PDCCH candidate starting earliest in time relative to other PDCCH candidates is to be selected as the reference, that the PDCCH candidate ending earliest in time relative to other PDCCH candidates is to be selected as the reference, that the PDCCH candidate starting latest in time relative to other PDCCH candidates is to be selected as the reference, or that the PDCCH candidate ending latest in time relative to other PDCCH candidates is to be selected as the reference, among other examples.

In some aspects, the UE may determine that the PDCCH candidate 405 satisfies the one or more reference criteria and may select the PDCCH candidate 405 as the reference. In some aspects, the UE may determine that the PDCCH candidate 410 satisfies the one or more reference criteria and may select the PDCCH candidate 410 as the reference.

In some aspects, as shown in FIG. 4A, the previous PUSCH transmissions may be transmitted without repetition. The UE may determine a validity of the DFI for the previous PUSCH transmissions based at least in part on the previous PUSCH transmissions being transmitted without repetition. For example, the UE may determine a validity of the DFI for a previous PUSCH transmission based at least in part on whether a last symbol of the previous PUSCH transmission was transmitted at least a particular quantity of symbols prior to a first symbol of the reference, in a manner similar to that described elsewhere herein. As shown in FIG. 4A, the UE may determine that the DFI is valid for the previous PUSCH transmissions associated with the HARQ IDs 8, 0, and 1 based at least in part on the last symbol of the previous PUSCH transmissions being transmitted at least the particular quantity of symbols prior to the first symbol of the reference. As also shown in FIG. 4A, the UE may determine that the DFI is not valid for the previous PUSCH transmission associated with the HARQ ID 3 based at least in part on the last symbol of the previous PUSCH transmission not being transmitted at least the particular quantity of symbols prior to the first symbol of the reference.

Figure 4B:
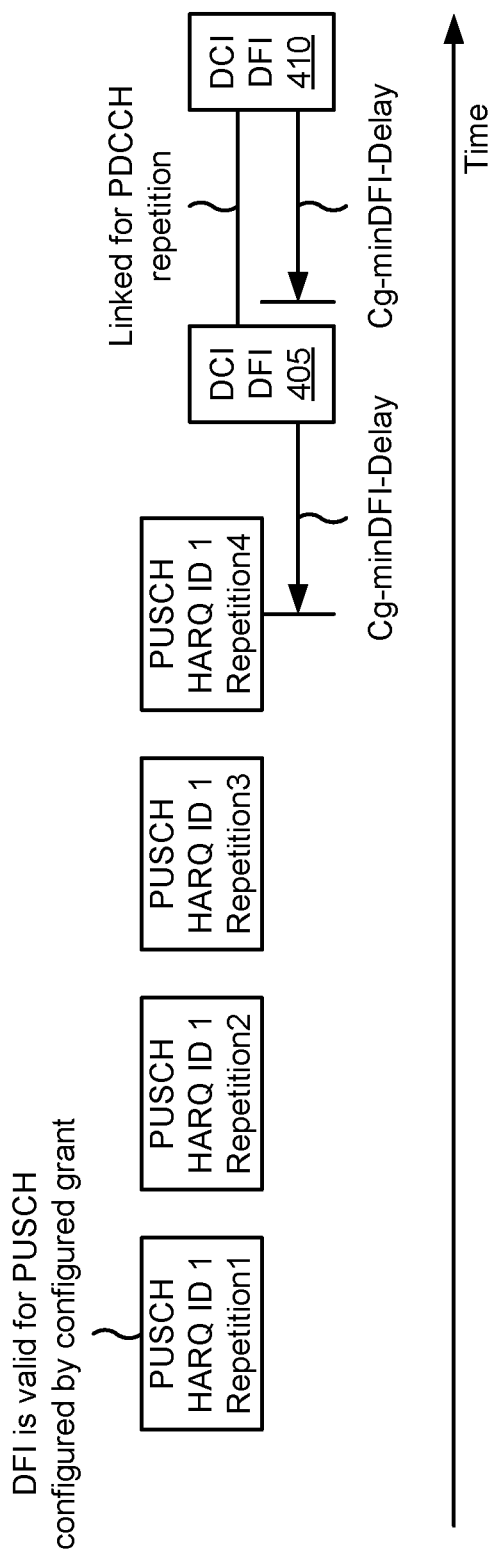

In some aspects, as shown in FIG. 4B, a previous PUSCH transmission may be configured by a configured grant and may be transmitted with repetition. The UE may determine a validity of the DFI for the previous PUSCH transmission based at least in part on the previous PUSCH transmission being configured by a configured grant and based at least in part on the previous PUSCH transmission being transmitted with repetition. For example, the UE may determine a validity of the DFI for the previous PUSCH transmission based at least in part on whether a last symbol of any repetition of the previous PUSCH transmission was transmitted at least a particular quantity of symbols prior to a first symbol of the reference, in a manner similar to that described elsewhere herein. As shown in FIG. 4B, the UE may determine that the DFI is valid for the previous PUSCH transmission based at least in part on the last symbol of at least the first repetition of the previous PUSCH transmission being transmitted at least the particular quantity of symbols prior to the first symbol of the reference.

Figure 4C:
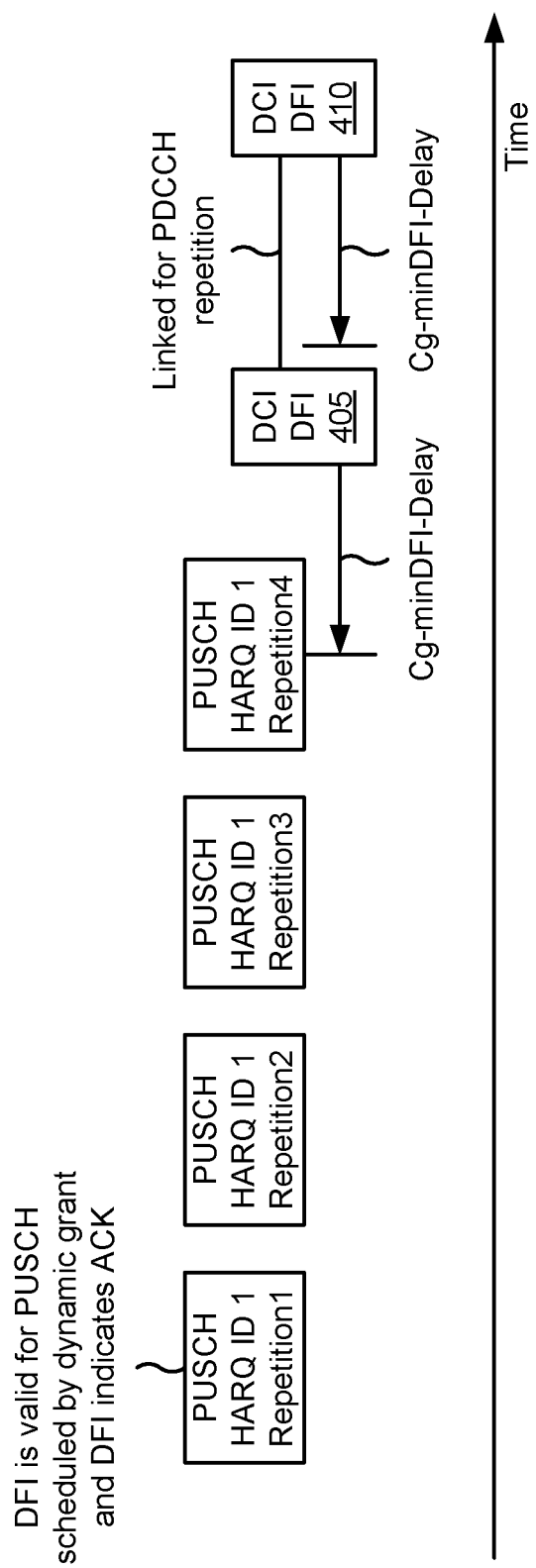

In some aspects, as shown in FIG. 4C, a previous PUSCH transmission may be scheduled by a dynamic grant and may be transmitted with repetitions. In some aspects, as also shown in FIG. 4C, the DFI may indicate an ACK. The UE may determine a validity of the DFI for the previous PUSCH transmission based at least in part on the previous PUSCH transmission being scheduled by a dynamic grant and based at least in part on the DFI indicating the ACK. For example, the UE may determine a validity of the DFI for the previous PUSCH transmission based at least in part on whether a last symbol of the first repetition of the previous PUSCH transmission was transmitted at least a particular quantity of symbols prior to a first symbol of the reference, in a manner similar to that described elsewhere herein. As shown in FIG. 4C, the UE may determine that the DFI is valid for the previous PUSCH transmission based at least in part on the last symbol of the first repetition of the previous PUSCH transmission being transmitted at least the particular quantity of symbols prior to the first symbol of the reference.

Figure 4D:
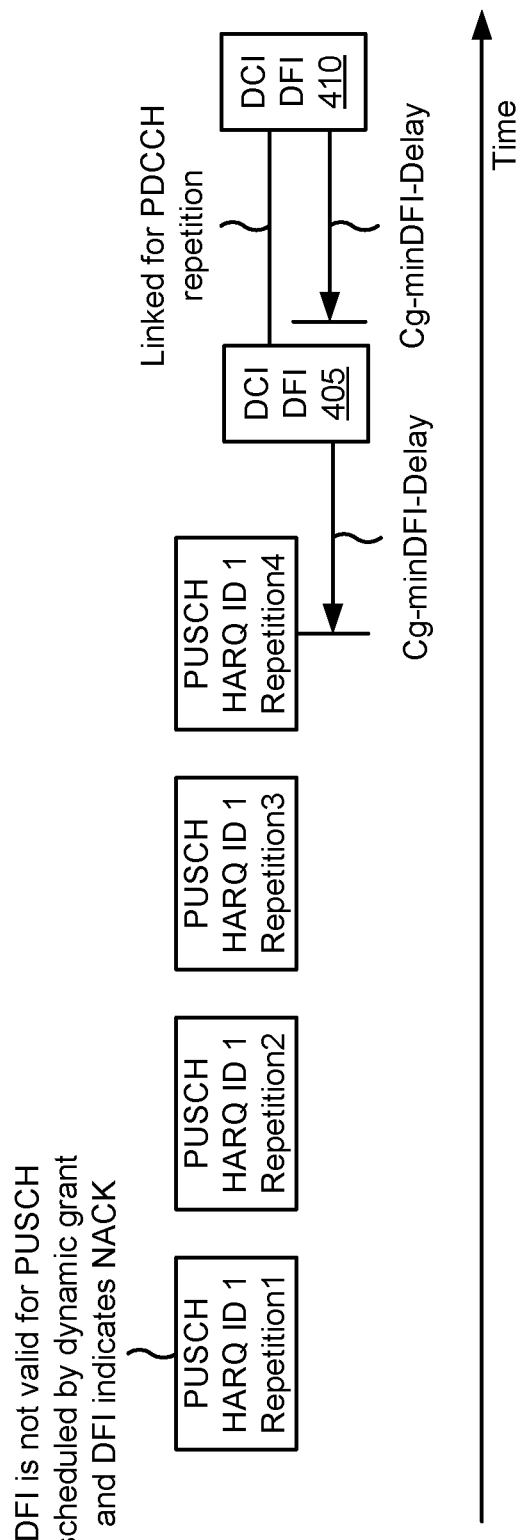

In some aspects, as shown in FIG. 4D, the DFI may indicate a NACK. The UE may determine a validity of the DFI for the previous PUSCH transmission based at least in part on the previous PUSCH transmission being scheduled by a dynamic grant and based at least in part on the DFI indicating the NACK. For example, the UE may determine a validity of the DFI for the previous PUSCH transmission based at least in part on whether a last symbol of the last repetition of the previous PUSCH transmission was transmitted at least a particular quantity of symbols prior to a first symbol of the reference, in a manner similar to that described elsewhere herein. As shown in FIG. 4D, the UE may determine that the DFI is not valid for the previous PUSCH transmission based at least in part on the last symbol of the last repetition of the previous PUSCH transmission not being transmitted at least the particular quantity of symbols prior to the first symbol of the reference.

As indicated above, FIGS. 4A-4D are provided as examples. Other examples may differ from what is described with respect to FIGS. 4A-4D.

Figure 5:
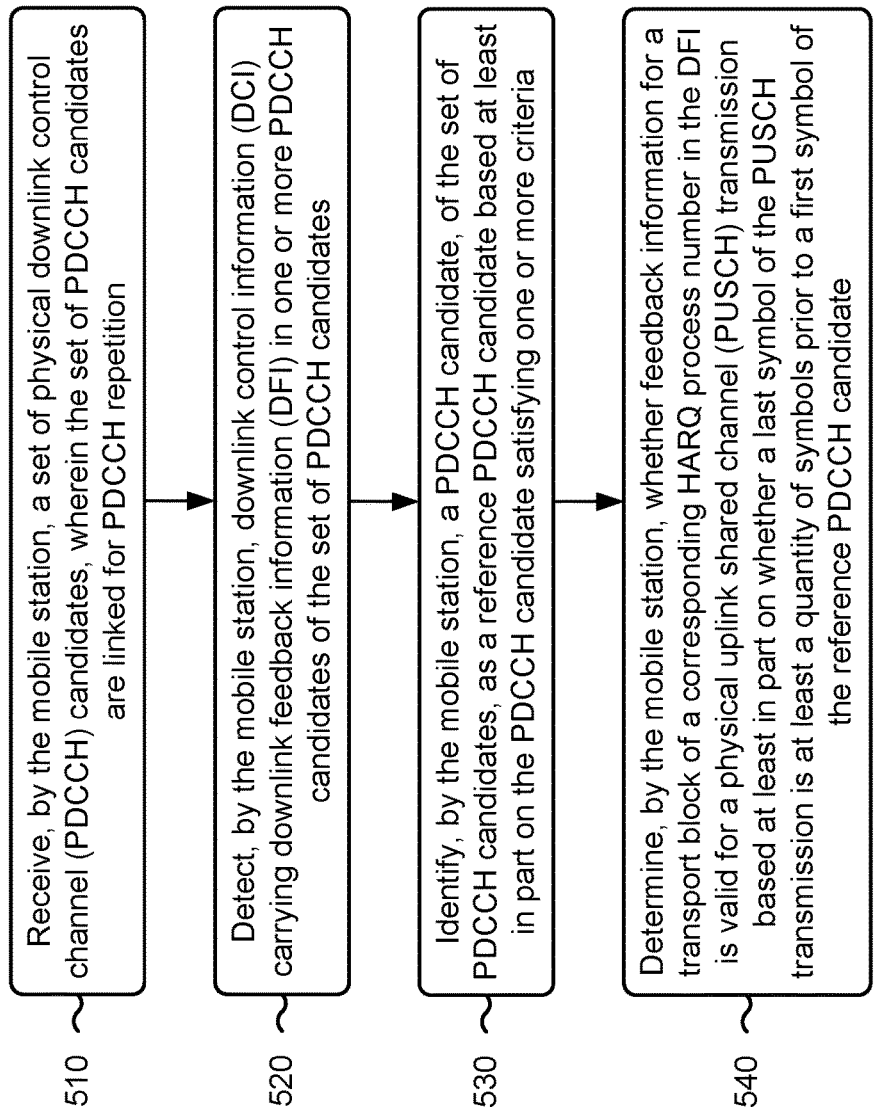
FIG. 5 is a diagram illustrating an example process associated with DFI with PDCCH repetition, in accordance with the present disclosure.

FIG. 5 is a diagram illustrating an example process 500 performed, for example, by a mobile station, in accordance with the present disclosure. Example process 500 is an example where the mobile station (e.g., UE 120) performs operations associated with DFI with PDCCH repetition.

As shown in FIG. 5, in some aspects, process 500 may include receiving a set of PDCCH candidates, wherein the set of PDCCH candidates are linked for PDCCH repetition (block 510). For example, the mobile station (e.g., using communication manager 140 and/or reception component 602, depicted in FIG. 6) may receive a set of PDCCH candidates, wherein the set of PDCCH candidates are linked for PDCCH repetition, as described above.

As further shown in FIG. 5, in some aspects, process 500 may include detecting DCI carrying DFI in one or more PDCCH candidates of the set of PDCCH candidates (block 520). For example, the mobile station (e.g., using communication manager 140 and/or detection component 608, depicted in FIG. 6) may detect DCI carrying DFI in one or more PDCCH candidates of the set of PDCCH candidates, as described above.

As further shown in FIG. 5, in some aspects, process 500 may include identifying a PDCCH candidate, of the set of PDCCH candidates, as a reference PDCCH candidate based at least in part on the PDCCH candidate satisfying one or more criteria (block 530). For example, the mobile station (e.g., using communication manager 140 and/or identification component 610, depicted in FIG. 6) may identify a PDCCH candidate, of the set of PDCCH candidates, as a reference PDCCH candidate based at least in part on the PDCCH candidate satisfying one or more criteria, as described above.

As further shown in FIG. 5, in some aspects, process 500 may include determining whether feedback information for a transport block of a corresponding HARQ process number in the DFI is valid for a PUSCH transmission based at least in part on whether a last symbol of the PUSCH transmission is at least a quantity of symbols prior to a first symbol of the reference PDCCH candidate (block 540). For example, the mobile station (e.g., using communication manager 140 and/or determination component 612, depicted in FIG. 6) may determine whether feedback information for a transport block of a corresponding HARQ process number in the DFI is valid for a PUSCH transmission based at least in part on whether a last symbol of the PUSCH transmission is at least a quantity of symbols prior to a first symbol of the reference PDCCH candidate, as described above.

Process 500 may include additional aspects, such as any single aspect or any combination of aspects described below and/or in connection with one or more other processes described elsewhere herein.

In a first aspect, the DCI is associated with a DCI format 0_1 and a CRC scrambled by a CS-RNTI, and a DFI flag of the DCI is set to a first value indicating that the DCI includes the DFI.

In a second aspect, alone or in combination with the first aspect, the PDCCH candidate satisfies the one or more criteria based at least in part on the PDCCH candidate starting earliest in time relative to other PDCCH candidates of the set of PDCCH candidates.

In a third aspect, alone or in combination with one or more of the first and second aspects, the PDCCH candidate satisfies the one or more criteria based at least in part on the PDCCH candidate starting latest in time relative to other PDCCH candidates of the set of PDCCH candidates.

In a fourth aspect, alone or in combination with one or more of the first through third aspects, the PDCCH candidate satisfies the one or more criteria based at least in part on the PDCCH candidate ending earliest in time relative to other PDCCH candidates of the set of PDCCH candidates.

In a fifth aspect, alone or in combination with one or more of the first through fourth aspects, the PDCCH candidate satisfies the one or more criteria based at least in part on the PDCCH candidate ending latest in time relative to other PDCCH candidates of the set of PDCCH candidates.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
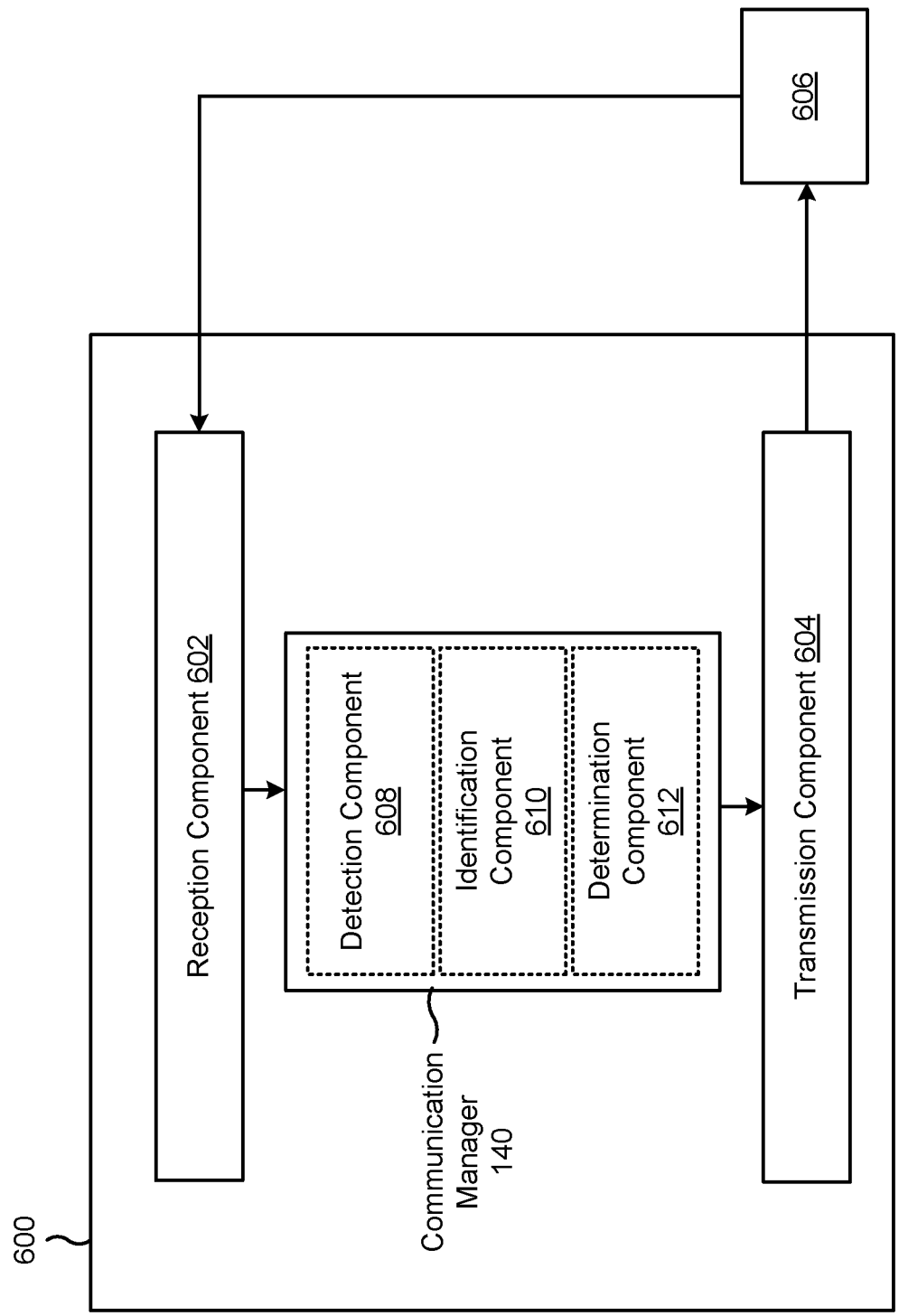
FIG. 6 is a diagram of an example apparatus for wireless communication, in accordance with the present disclosure.

FIG. 6 is a diagram of an example apparatus 600 for wireless communication. The apparatus 600 may be a mobile station, or a mobile station may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include the communication manager 140. The communication manager 140 may include one or more of a detection component 608, an identification component 610, or a determination component 612, among other examples.

In some aspects, the apparatus 600 may be configured to perform one or more operations described herein in connection with FIGS. 4A-4D. Additionally, or alternatively, the apparatus 600 may be configured to perform one or more processes described herein, such as process 500 of FIG. 5. In some aspects, the apparatus 600 and/or one or more components shown in FIG. 6 may include one or more components of the mobile station described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a modem, a demodulator, a MIMO detector, a receive processor, a controller/processor, a memory, or a combination thereof, of the mobile station described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modem, a modulator, a transmit MIMO processor, a transmit processor, a controller/processor, a memory, or a combination thereof, of the mobile station described in connection with FIG. 2. In some aspects, the transmission component 604 may be co-located with the reception component 602 in a transceiver.

The reception component 602 may receive a set of PDCCH candidates, wherein the set of PDCCH candidates are linked for PDCCH repetition. The detection component 608 may detect DCI carrying DFI in one or more PDCCH candidates of the set of PDCCH candidates. The identification component 610 may identify a PDCCH candidate, of the set of PDCCH candidates, as a reference PDCCH candidate based at least in part on the PDCCH candidate satisfying one or more criteria. The determination component 612 may determine whether feedback information for a transport block of a corresponding HARQ process number in the DFI is valid for a PUSCH transmission based at least in part on whether a last symbol of the PUSCH transmission is at least a quantity of symbols prior to a first symbol of the reference PDCCH candidate.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

The following provides an overview of some Aspects of the present disclosure:

Aspect 1: A method of wireless communication performed by a mobile station, comprising: receiving, by the mobile station, a set of PDCCH candidates, wherein the set of PDCCH candidates are linked for PDCCH repetition; detecting, by the mobile station, DCI carrying DFI in one or more PDCCH candidates of the set of PDCCH candidates; identifying, by the mobile station, a PDCCH candidate, of the set of PDCCH candidates, as a reference PDCCH candidate based at least in part on the PDCCH candidate satisfying one or more criteria; and determining, by the mobile station, whether feedback information for a transport block of a corresponding HARQ process number in the DFI is valid for a PUSCH transmission based at least in part on whether a last symbol of the PUSCH transmission is at least a quantity of symbols prior to a first symbol of the reference PDCCH candidate.

Aspect 2: The method of Aspect 1, wherein the DCI is associated with a DCI format 0_1 and a CRC scrambled by a CS-RNTI, and wherein a DFI flag of the DCI is set to a first value indicating that the DCI includes the DFI.

Aspect 3: The method of one or more of Aspects 1 and 2, wherein the PDCCH candidate satisfies the one or more criteria based at least in part on the PDCCH candidate starting earliest in time relative to other PDCCH candidates of the set of PDCCH candidates.

Aspect 4: The method of one or more of Aspects 1 through 3, wherein the PDCCH candidate satisfies the one or more criteria based at least in part on the PDCCH candidate starting latest in time relative to other PDCCH candidates of the set of PDCCH candidates.

Aspect 5: The method of one or more of Aspects 1 through 4, wherein the PDCCH candidate satisfies the one or more criteria based at least in part on the PDCCH candidate ending earliest in time relative to other PDCCH candidates of the set of PDCCH candidates.

Aspect 6: The method of one or more of Aspects 1 through 5, wherein the PDCCH candidate satisfies the one or more criteria based at least in part on the PDCCH candidate ending latest in time relative to other PDCCH candidates of the set of PDCCH candidates.

Aspect 7: An apparatus for wireless communication at a device, comprising a processor; memory coupled with the processor; and instructions stored in the memory and executable by the processor to cause the apparatus to perform the method of one or more of Aspects 1 through 6.

Aspect 8: A device for wireless communication, comprising a memory and one or more processors coupled to the memory, the one or more processors configured to perform the method of one or more of Aspects 1 through 6.

Aspect 9: An apparatus for wireless communication, comprising at least one means for performing the method of one or more of Aspects 1 through 6.

Aspect 10: A non-transitory computer-readable medium storing code for wireless communication, the code comprising instructions executable by a processor to perform the method of one or more of Aspects 1 through 6.

Aspect 11: A non-transitory computer-readable medium storing a set of instructions for wireless communication, the set of instructions comprising one or more instructions that, when executed by one or more processors of a device, cause the device to perform the method of one or more of Aspects 1 through 6.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:
one or more memories; and
one or more processors, individually or collectively coupled to the one or more memories and based at least in part on information stored in the one or more memories, configured to:
transmit a physical uplink shared channel (PUSCH); and receive downlink control information (DCI) carrying downlink feedback information (DFI) in one or more physical downlink control channel (PDCCH) candidates of a set of PDCCH candidates,
wherein the set of PDCCH candidates are linked for PDCCH repetition, and
wherein the mobile station determines whether feedback information for a transport block of a corresponding hybrid automatic repeat request (HARQ) process number in the DFI is valid for a transmission of the PUSCH based at least in part on whether a last symbol of the transmission of the PUSCH is at least a particular quantity of symbols prior to a first symbol of a PDCCH candidate of the set of PDCCH candidates,
wherein at least one of:
the PDCCH candidate starts earliest in time relative to other PDCCH candidates of the set of PDCCH candidates, or
the PDCCH candidate ends latest in time relative to other PDCCH candidates of the set of PDCCH candidates.

2. The mobile station of claim 1, wherein the DCI is associated with a DCI format 0_1 and a cyclic redundancy check (CRC) scrambled by a configured scheduling radio network temporary identifier (CS-RNTI), and wherein a DFI flag field of the DCI is set to a first value indicating that the DCI includes the DFI.

3. The mobile station of claim 1, wherein the PDCCH candidate starts earliest in time relative to other PDCCH candidates of the set of PDCCH candidates.

4. The mobile station of claim 1, wherein the PDCCH candidate starts latest in time relative to other PDCCH candidates of the set of PDCCH candidates.

5. The mobile station of claim 1, wherein the PDCCH candidate ends earliest in time relative to other PDCCH candidates of the set of PDCCH candidates.

6. The mobile station of claim 1, wherein the PDCCH candidate ends latest in time relative to other PDCCH candidates of the set of PDCCH candidates.

7. The mobile station of claim 1, wherein the one or more processors are further configured to:
identify the PDCCH candidate as a reference PDCCH candidate based at least in part on the PDCCH candidate satisfying one or more criteria.

8. The mobile station of claim 7, wherein the PDCCH candidate satisfies the one or more criteria based at least in part on the PDCCH candidate starting earliest in time relative to the other PDCCH candidates of the set of PDCCH candidates.

9. A method of wireless communication performed by a mobile station, comprising:
transmitting a physical uplink shared channel (PUSCH); and
receiving, by the mobile station, downlink control information (DCI) carrying downlink feedback information (DFI) in one or more physical downlink control channel (PDCCH) candidates of a set of PDCCH candidates,
wherein the set of PDCCH candidates are linked for PDCCH repetition, and
wherein the mobile station determines whether feedback information for a transport block of a corresponding hybrid automatic repeat request (HARQ) process number in the DFI is valid for a transmission of the PUSCH based at least in part on whether a last symbol of the transmission of the PUSCH is at least a particular quantity of symbols prior to a first symbol of a PDCCH candidate of the set of PDCCH candidates,
wherein at least one of:
the PDCCH candidate starts earliest in time relative to other PDCCH candidates of the set of PDCCH candidates, or
the PDCCH candidate ends latest in time relative to other PDCCH candidates of the set of PDCCH candidates.

10. The method of claim 9, wherein the DCI is associated with a DCI format 0_1 and a cyclic redundancy check (CRC) scrambled by a configured scheduling radio network temporary identifier (CS-RNTI), and wherein a DFI flag of the DCI is set to a first value indicating that the DCI includes the DFI.

11. The method of claim 9, wherein the PDCCH candidate starts earliest in time relative to other PDCCH candidates of the set of PDCCH candidates.

12. The method of claim 9, wherein the PDCCH candidate starts latest in time relative to other PDCCH candidates of the set of PDCCH candidates.

13. The method of claim 9, wherein the PDCCH candidate ends earliest in time relative to other PDCCH candidates of the set of PDCCH candidates.

14. The method of claim 9, wherein the PDCCH candidate ends latest in time relative to other PDCCH candidates of the set of PDCCH candidates.

15. The method of claim 9, further comprising:
identifying the PDCCH candidate as a reference PDCCH candidate based at least in part on the PDCCH candidate satisfying one or more criteria.

16. The method of claim 15, wherein the PDCCH candidate satisfies the one or more criteria based at least in part on the PDCCH candidate starting earliest in time relative to the other PDCCH candidates of the set of PDCCH candidates.

17. A non-transitory computer-readable medium storing a set of instructions for wireless communication, the set of instructions comprising:
one or more instructions that, when executed by one or more processors of a mobile station, cause the mobile station to:
transmit a physical uplink shared channel (PUSCH); and
receive downlink control information (DCI) carrying downlink feedback information (DFI) in one or more physical downlink control channel (PDCCH) candidates of the set of PDCCH candidates,
wherein the set of PDCCH candidates are linked for PDCCH repetition, and
wherein the mobile station determines whether feedback information for a transport block of a corresponding hybrid automatic repeat request (HARQ) process number in the DFI is valid for a transmission of the PUSCH based at least in part on whether a last symbol of the transmission of the PUSCH is at least a particular quantity of symbols prior to a first symbol of a PDCCH candidate of the set of PDCCH candidates,
wherein at least one of:
the PDCCH candidate starts earliest in time relative to other PDCCH candidates of the set of PDCCH candidates, or
the PDCCH candidate ends latest in time relative to other PDCCH candidates of the set of PDCCH candidates.

18. The non-transitory computer-readable medium of claim 17, wherein the DCI is associated with a DCI format 0_1 and a cyclic redundancy check (CRC) scrambled by a configured scheduling radio network temporary identifier (CS-RNTI), and wherein a DFI flag of the DCI is set to a first value indicating that the DCI includes the DFI.

19. The non-transitory computer-readable medium of claim 17, wherein the PDCCH candidate starts earliest in time relative to other PDCCH candidates of the set of PDCCH candidates.

20. The non-transitory computer-readable medium of claim 17, wherein the PDCCH candidate starts latest in time relative to other PDCCH candidates of the set of PDCCH candidates.

21. The non-transitory computer-readable medium of claim 17, wherein the PDCCH candidate ends earliest in time relative to other PDCCH candidates of the set of PDCCH candidates.

22. The non-transitory computer-readable medium of claim 17, wherein the PDCCH candidate ends latest in time relative to other PDCCH candidates of the set of PDCCH candidates.

23. The non-transitory computer-readable medium of claim 17, wherein the one or more instructions that, when executed by one or more processors of a mobile station, further cause the mobile station to:
identify the PDCCH candidate as a reference PDCCH candidate based at least in part on the PDCCH candidate satisfying one or more criteria.

24. The non-transitory computer-readable medium of claim 23, wherein the PDCCH candidate satisfies the one or more criteria based at least in part on the PDCCH candidate starting earliest in time relative to the other PDCCH candidates of the set of PDCCH candidates.

25. An apparatus for wireless communication, comprising:
means for transmitting a physical uplink shared channel (PUSCH); and
means for receiving downlink control information (DCI) carrying downlink feedback information (DFI) in one or more physical downlink control channel (PDCCH) candidates of a set of PDCCH candidates,
wherein the set of PDCCH candidates are linked for PDCCH repetition, and
wherein the apparatus determines whether feedback information for a transport block of a corresponding hybrid automatic repeat request (HARQ) process number in the DFI is valid for a transmission of the PUSCH based at least in part on whether a last symbol of the transmission of the PUSCH is at least a particular quantity of symbols prior to a first symbol of a PDCCH candidate of the set of PDCCH candidates,
wherein at least one of:
the PDCCH candidate starts earliest in time relative to other PDCCH candidates of the set of PDCCH candidates, or
the PDCCH candidate ends latest in time relative to other PDCCH candidates of the set of PDCCH candidates.

26. The apparatus of claim 25, wherein the DCI is associated with a DCI format 0_1 and a cyclic redundancy check (CRC) scrambled by a configured scheduling radio network temporary identifier (CS-RNTI), and wherein a DFI flag of the DCI is set to a first value indicating that the DCI includes the DFI.

27. The apparatus of claim 25, wherein the PDCCH candidate starts latest in time relative to other PDCCH candidates of the set of PDCCH candidates.

28. The apparatus of claim 25, wherein the PDCCH candidate starts earliest in time relative to other PDCCH candidates of the set of PDCCH candidates.

29. The apparatus of claim 25, wherein the PDCCH candidate ends earliest in time relative to other PDCCH candidates of the set of PDCCH candidates.

30. The apparatus of claim 25, wherein the PDCCH candidate ends latest in time relative to other PDCCH candidates of the set of PDCCH candidates.

* * * * *